(12) United States Patent
Lian et al.

(10) Patent No.: US 12,170,498 B2
(45) Date of Patent: Dec. 17, 2024

(54) ENERGY CONVERSION APPARATUS AND SAFETY CONTROL METHOD THEREFOR

(71) Applicant: BYD COMPANY LIMITED, Guangdong (CN)

(72) Inventors: Yubo Lian, Shenzhen (CN); Heping Ling, Shenzhen (CN); Changjiu Liu, Shenzhen (CN); Haijun Liu, Shenzhen (CN); Yunfeng Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 124 days.

(21) Appl. No.: 18/008,056

(22) PCT Filed: Jun. 4, 2021

(86) PCT No.: PCT/CN2021/098458
§ 371 (c)(1),
(2) Date: Dec. 2, 2022

(87) PCT Pub. No.: WO2021/244649
PCT Pub. Date: Dec. 9, 2021

(65) Prior Publication Data
US 2023/0268862 A1 Aug. 24, 2023

(30) Foreign Application Priority Data
Jun. 4, 2020 (CN) .......................... 202010501054.1

(51) Int. Cl.
*H02P 5/68* (2006.01)
*H01M 10/42* (2006.01)
(Continued)

(52) U.S. Cl.
CPC ........ *H02P 27/08* (2013.01); *H01M 10/4264* (2013.01); *H01M 10/46* (2013.01);
(Continued)

(58) Field of Classification Search
CPC ...... H02P 9/04; H02P 3/18; H02P 6/10; H02P 1/44; H02P 2207/05; H02P 25/04;
(Continued)

(56) References Cited

U.S. PATENT DOCUMENTS

| 4,763,347 A | 8/1988 | Erdman |
| 2009/0134700 A1 | 5/2009 | Tanaka et al. |

(Continued)

FOREIGN PATENT DOCUMENTS

| CN | 106347170 A | 1/2017 |
| CN | 107070334 U | 8/2017 |

(Continued)

OTHER PUBLICATIONS

International Search Report and Written Opinion for Application No. PCT/CN2021/098458, mailed on Aug. 11, 2021, 10 pages.

*Primary Examiner* — Kawing Chan
*Assistant Examiner* — Charles S Laughlin

(57) ABSTRACT

An energy conversion apparatus includes: a first switch module, a motor inverter having a first bus terminal connected with a first end of a battery and a second bus terminal connected with a second end of the battery through the first switch module, a motor winding having a first end connected with a midpoint end of the motor inverter, and a second switch module and a first capacitor connected in series. A first end of the serial-connected second switch module and the first capacitor is connected with a second end of the motor winding. A second end of the serial-connected second switch module and the first capacitor is connected with the second bus terminal.

13 Claims, 3 Drawing Sheets

(51) Int. Cl.
*H01M 10/46* (2006.01)
*H02J 7/34* (2006.01)
*H02M 1/32* (2007.01)
*H02M 7/5387* (2007.01)
*H02P 21/00* (2016.01)
*H02P 27/08* (2006.01)
*B60R 16/03* (2006.01)

(52) U.S. Cl.
CPC ............... *H02J 7/345* (2013.01); *H02M 1/32* (2013.01); *H02M 7/5387* (2013.01); *B60R 16/03* (2013.01); *H01M 2220/20* (2013.01); *H02J 2207/20* (2020.01)

(58) Field of Classification Search
CPC ...... H02P 6/085; H02P 2101/15; H02P 25/16; H02P 27/04; H02P 27/14; H02P 5/74; H02P 9/48; H02P 25/22; H02P 9/08; H02P 9/30; H02P 1/16; H02P 1/445; H02P 21/00; H02P 21/16; H02P 2101/10; H02P 2101/45; H02P 2201/09; H02P 23/0004; H02P 23/0077; H02P 23/08; H02P 23/14; H02P 23/22; H02P 23/26; H02P 27/048; H02P 29/024; H02P 29/0243; H02P 29/027; H02P 29/50; H02P 29/60; H02P 3/02; H02P 4/00; H02P 5/60; H02P 5/68; H02P 5/747; H02P 6/005; H02P 6/18; H02P 6/21; H02P 7/281; H02P 9/007; H02P 9/302; H02P 9/46; H02P 1/26; H02P 1/42; H02P 2207/03; H02P 25/092; H02P 25/18; H02P 27/047; H02P 3/12; H02P 3/14; H02P 6/182; H02P 9/40; H02H 3/16; H02H 7/16; H02H 9/005; H02H 7/0811; H02H 7/1203; H02H 1/043; H02H 11/003; H02H 11/004; H02H 3/025; H02H 3/08; H02H 7/06; H02H 7/1222; H02H 7/1225; H02H 7/1227; H02H 7/125; H02H 7/1252; H02H 9/002; H02H 9/04; H02H 11/00; H02H 7/04; H02H 7/0844; H02H 7/12; H02H 9/08
See application file for complete search history.

(56) References Cited

U.S. PATENT DOCUMENTS

2018/0334043 A1* 11/2018 Zou .................. H02M 1/08
2020/0313581 A1* 10/2020 Chon ................ H02M 1/36

FOREIGN PATENT DOCUMENTS

| CN | 108123428 A | 6/2018 |
|----|-------------|--------|
| CN | 209479442 U | 10/2019 |
| CN | 210225008 U | 3/2020 |
| CN | 110962631 A | 4/2020 |
| CN | 110971173 A | 4/2020 |
| CN | 111404245 A | 7/2020 |
| EP | 1034968 A | 9/2000 |
| JP | 2000324857 A | 11/2000 |
| JP | 2011051545 A | 3/2011 |
| JP | 2016-083977 A | 5/2016 |

* cited by examiner

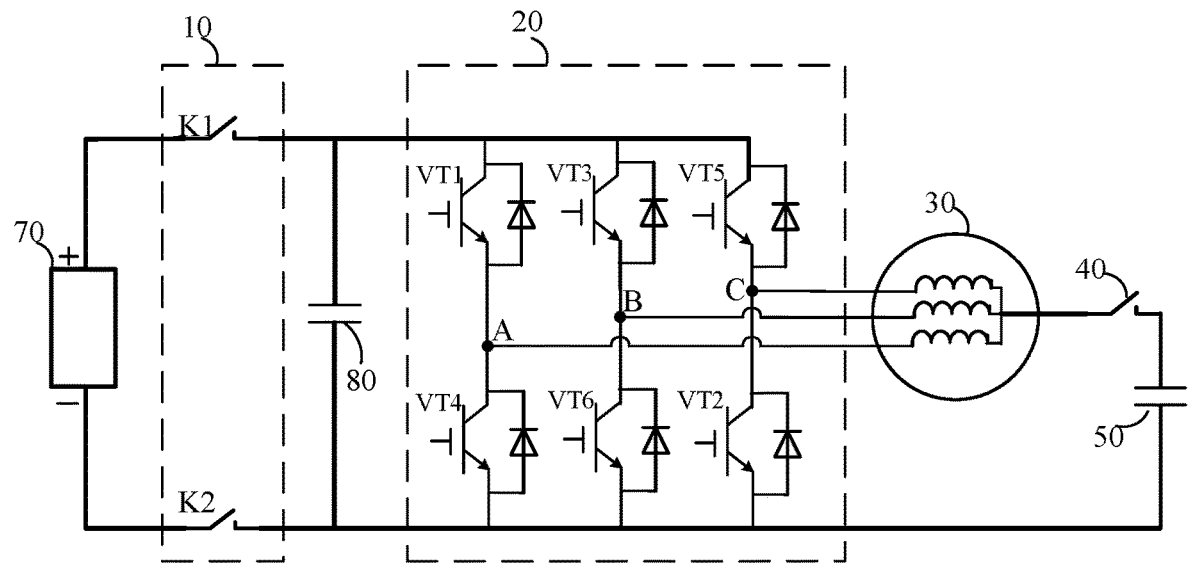

FIG. 3

```
┌─────────────────────────────────────────────────┐   ┌─41
│ A first switch module is controlled to be turned off based on a │
│ command representing release of an accumulator, to disconnect the │
│ battery from a motor inverter                   │
└─────────────────────────────────────────────────┘
                          │
                          ▼
┌─────────────────────────────────────────────────┐   ┌─42
│ When a second switch module is turned on, the motor inverter is │
│ controlled to release energy stored in a first capacitor │
└─────────────────────────────────────────────────┘
```

FIG. 4

```
┌─────────────────────────────────────────────────┐   ┌─51
│ A first switch module is controlled to be turned off based on a │
│ command representing release of an accumulator, to disconnect a │
│ battery from a second capacitor and a motor inverter │
└─────────────────────────────────────────────────┘
                          │
                          ▼
┌─────────────────────────────────────────────────┐   ┌─52
│ When a second switch module is turned on, the motor inverter is │
│ controlled to release the energy stored in a first capacitor and energy │
│ stored in the second capacitor                  │
└─────────────────────────────────────────────────┘
```

FIG. 5

ENERGY CONVERSION APPARATUS AND SAFETY CONTROL METHOD THEREFOR

CROSS-REFERENCE TO RELATED APPLICATIONS

The application is a national phase application of International Patent Application No. PCT/CN2021/098458 filed with the China National Intellectual Property Administration (CNIPA) on Jun. 4, 2021, which is based on and claims priority to and benefits of Chinese Patent Application No. 202010501054.1, filed by BYD Co., Ltd. on Jun. 4, 2020 and entitled "ENERGY CONVERSION APPARATUS AND SAFETY CONTROL METHOD THEREFOR". The above-referenced applications are incorporated herein by reference in their entirety.

FIELD

The present disclosure relates to the field of vehicles, and in particular, to an energy conversion apparatus and a safety control method thereof.

BACKGROUND

With the wide use of new energy, batteries can be used as power sources in various fields. Performance of a battery varies with different environment where the battery is used as a power source. For example, the performance of the battery in a low temperature environment is much lower than that in a normal temperature environment. For example, at zero temperature, the discharge capacity of the battery decreases with the decrease of the temperature. At −30° C., the discharge capacity of the battery is substantially 0, resulting in a failure of the battery. In order to use the battery in a low temperature environment, the battery is required to be heated.

SUMMARY

The present disclosure is intended to provide an energy conversion apparatus and a safety control method therefor, which can realize the safety control of the energy conversion apparatus.

A first embodiment of the present disclosure provides an energy conversion apparatus, including:
  a first switch module;
  a motor inverter, having a first bus terminal connected with a first end of a battery and a second bus terminal connected with a second end of the battery, where the first switch module is configured to control the connection and disconnection of the first bus terminal of the motor inverter and the first end of the battery; or the first switch module is configured to control the connection and disconnection of the second bus terminal of the motor inverter and the second end of the battery; or the first switch module is configured to control the connection and disconnection between the first bus terminal of the motor inverter and the first end of the battery and the connection and disconnection of the second bus terminal of the motor inverter and the second end of the battery;
  a motor winding, having a first end connected with a midpoint end of the motor inverter;
  a second switch module and a first capacitor, where the second switch module and the first capacitor are serial-connected; a first end of the serial-connected second switch module and the first capacitor is connected with a second end of the motor winding; and a second end of the serial-connected second switch module and the first capacitor is connected with the second bus terminal of the motor inverter; and
  a controller, configured to: control the first switch module to be turned off based on a command representing release of an accumulator, to disconnect the battery from the motor inverter, and control the motor inverter to release energy stored in the first capacitor when the second switch module is turned on.

Optionally, the energy conversion apparatus further includes a second capacitor. A first end of the second capacitor is connected with the first bus terminal of the motor inverter. A second end of the second capacitor is connected with the second bus terminal of the motor inverter.

The controller is further configured to: control the first switch module to be turned off based on the command representing release of the accumulator, to disconnect the battery from the second capacitor and the motor inverter, and control the motor inverter to release the energy stored in the first capacitor and energy stored in the second capacitor when the second switch module is turned on.

A second embodiment of the present disclosure provides a safety control method for an energy conversion apparatus. The energy conversion apparatus includes:
  a first switch module;
  a motor inverter, having a first bus terminal connected with a first end of a battery and a second bus terminal connected with a second end of the battery, where the first switch module is configured to control the connection and disconnection of the first bus terminal of the motor inverter and the first end of the battery; or the first switch module is configured to control the connection and disconnection of the second bus terminal of the motor inverter and the second end of the battery; or the first switch module is configured to control the connection and disconnection of the first bus terminal of the motor inverter and the first end of the battery and the connection and disconnection of the second bus terminal of the motor inverter and the second end of the battery;
  a motor winding, having a first end connected with a midpoint end of the motor inverter; and
  a second switch module and a first capacitor, where the second switch module and the first capacitor are serial-connected; a first end of the serial-connected second switch module and the first capacitor is connected with a second end of the motor winding; and a second end of the serial-connected second switch module and the first capacitor is connected with the second bus terminal of the motor inverter.

The method includes: controlling the first switch module to be turned off based on a command representing release of an accumulator, to disconnect the battery from the motor inverter, and controlling the motor inverter to release energy stored in the first capacitor when the second switch module is turned on.

Optionally, the energy conversion apparatus further includes a second capacitor. A first end of the second capacitor is connected with the first bus terminal of the motor inverter. A second end of the second capacitor is connected with the second bus terminal of the motor inverter.

The method further includes: controlling the first switch module to be turned off based on the command representing release of the accumulator, to disconnect the battery from the second capacitor and the motor inverter, and controlling the motor inverter to release the energy stored in the first capacitor and energy stored in the second capacitor when the second switch module is closed.

Optionally, the controlling the motor inverter to release the energy stored in the first capacitor and energy stored in the second capacitor includes: controlling the motor inverter to release the energy stored in the first capacitor, and controlling the motor inverter to release the energy stored in the second capacitor through the first capacitor.

Optionally, the motor inverter includes an upper bridge arm and a lower bridge arm.

The controlling the motor inverter to release the energy stored in the first capacitor includes: controlling the upper bridge arm to be turned off, and controlling the lower bridge arm to be alternately turned off and turned on, so as to release the energy stored in the first capacitor.

Optionally, the controlling the motor inverter to release the energy stored in the second capacitor through the first capacitor includes:

controlling the upper bridge arm of the motor inverter to be turned on, so that the second capacitor charges the first capacitor;

controlling the upper bridge arm to be turned off and controlling the lower bridge arm of the motor inverter to be alternately turned on and turned off, so as to release the energy stored in the charged first capacitor; and repeating the step of controlling the upper bridge arm of the motor inverter to be turned on and the step of controlling the upper bridge arm to be turned off and controlling the lower bridge arm of the motor inverter to be alternately turned off and turned on, until a voltage of the second capacitor is lower than a preset voltage.

Optionally, a time the second capacitor charges the first capacitor is calibrated according to a vehicle type, a capacitance value of the first capacitor, and a capacitance value of the second capacitor.

Optionally, the alternate turning on and off of the lower bridge arm is adjusted by: controlling a duty cycle of the lower bridge arm to gradually increase from a first duty cycle to a second duty cycle, and controlling the duty cycle of the lower bridge arm to gradually decrease from the second duty cycle to the first duty cycle.

Optionally, the second switch module being turned on can include at least one of the following:

the second switch module is sintered;

after charging of the battery through the energy conversion apparatus is completed, the second switch module is not sintered, and the second switch module is controlled to be turned on based on the command representing the release of the accumulator;

after self-heating of the battery through the energy conversion apparatus is completed, the second switch module is not sintered, and the second switch module is controlled to be turned on based on the command representing the release of the accumulator; or after implementing the drive function the energy conversion apparatus, the second switch module is not sintered, and the second switch module is controlled to be turned on based on the command representing the release of the accumulator.

Optionally, the sintering of the second switch module is determined by: controlling the second switch module to be turned off, and controlling the first switch module to connect the battery and the motor inverter; controlling the lower bridge arm of the motor inverter to be turned off, and controlling at least one upper bridge arm of the motor inverter to be turned on; and determining that the second switch module is sintered if current flows through the motor inverter.

Optionally, the sintering of the second switch module is determined by: controlling the second switch module to be turned on, and controlling the first switch module to connect the battery with the motor inverter; controlling the lower bridge arm of the motor inverter to be turned off, and controlling at least one upper bridge arm of the motor inverter to be turned on, so that the battery charges the second capacitor; controlling the second switch module to be turned off, controlling the upper bridge arm of the motor inverter to be turned off, and controlling at least one lower bridge arm of the motor inverter to be turned on and determining that the second switch module is sintered if current flows through the motor inverter.

The above technical solutions have the following beneficial effects.

The energy conversion apparatus in the present disclosure can realize the motor driving function by controlling the second switch module to be turned off, and can realize the battery heating function by controlling the second switch module to be turned on.

Since the energy release of the first capacitor 50 can be realized through the linkage between the components of the energy conversion apparatus, additional components are not required, which can reduce the costs of the whole vehicle.

Since the motor inverter is controlled to release the energy stored in the first capacitor when the first switch module disconnects the battery from the motor inverter and the second switch module is in a conductive state, the following benefits are realized. On the one hand, a high voltage safety problem caused by the battery during the energy release of the first capacitor is resolved. On the other hand, it can be learned from a topology of FIG. 1 that during the energy release, the first switch module is in an off state and the second switch module is in a conductive state. Therefore, the first capacitor releases the energy by a circulating loop composed of the motor inverter, the motor winding, the second switch module, and the first capacitor. That is to say, energy losses caused by the repeated switching of the motor inverter, energy consumption generated by the motor inverter in the conductive state, and heat losses on the motor winding realize consumption of the high voltage energy on the first capacitor, thereby realizing the energy release of the first capacitor. In addition, since a release current during the release is not very large, false sintering of the second switch module caused by software bugs or incomplete sintering caused by the second switch module is prevented from turning into true sintering of the second switch module, thereby preventing secondary damage to the second switch module.

Other features and advantages of the present disclosure will be described in detail in the following part of specific implementations.

BRIEF DESCRIPTION OF THE DRAWINGS

The accompanying drawing is used to further understand the present disclosure and constitute a part of the specification, and is used to explain the present disclosure together with the following specific implementations, but does not constitute a limitation on the present disclosure. In the accompanying drawings:

FIG. 3 is a schematic circuit diagram of the energy conversion apparatus according to an embodiment of the present disclosure.

FIG. 4 is a flowchart of a safety control method for an energy conversion apparatus according to an embodiment of the present disclosure.

FIG. 5 is another flowchart of the safety control method for an energy conversion apparatus according to an embodiment of the present disclosure.

DETAILED DESCRIPTION

The following describes the specific implementations of the present disclosure in detail with reference to the accompanying drawings. It should be understood that the specific implementations described herein are merely used for describing and illustrating the present disclosure rather than limiting the present disclosure.

Figure 1:
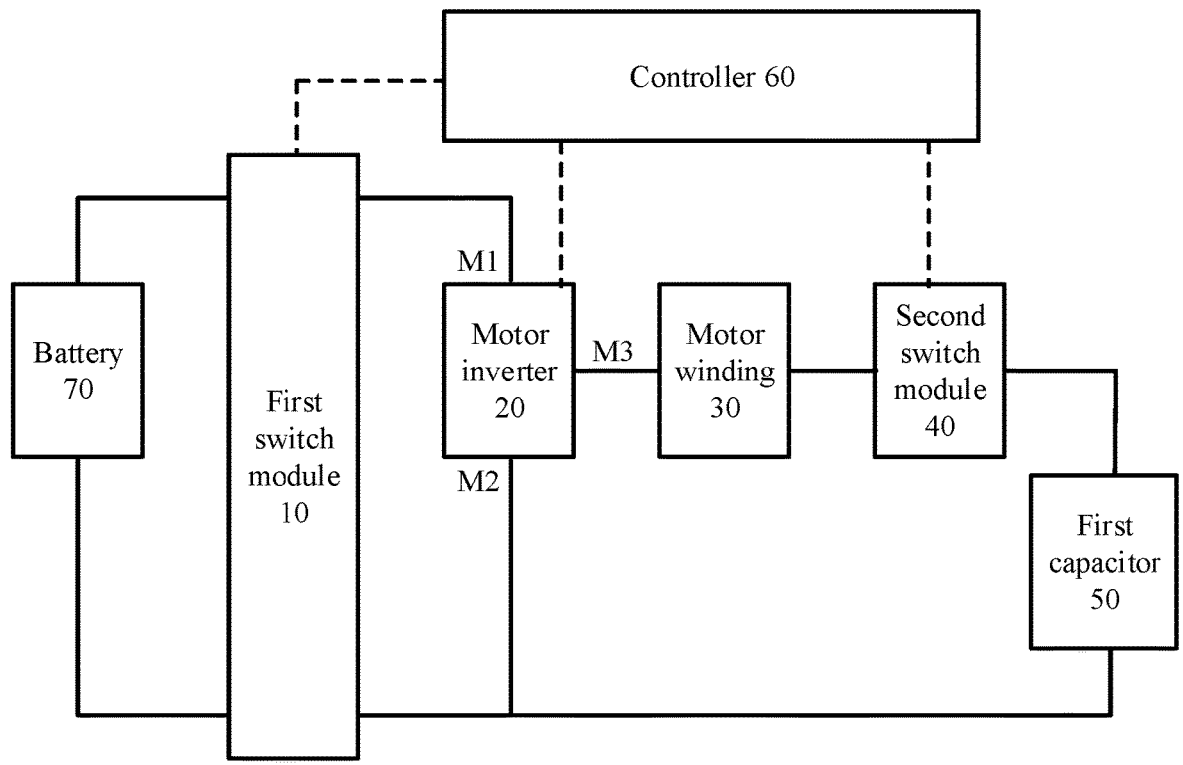
FIG. 1 shows a schematic topology structure of an energy conversion apparatus according to an embodiment of the present disclosure.

FIG. 1 shows a schematic topology structure of an energy conversion apparatus according to an embodiment of the present disclosure. As shown in FIG. 1, the energy conversion apparatus includes a first switch module 10, a motor inverter 20, a motor winding 30, a second switch module 40, a first capacitor 50, and a controller 60. Dashed lines in FIG. 1 mean that the controller 60 transmits control signals to the first switch module 10, the motor inverter 20, and the second switch module 40, to control operations of the first switch module 10, the motor inverter 20, and the second switch module 40.

As shown in FIG. 1, a first bus terminal M1 of the motor inverter 20 is connected with a first end of a battery 70, and a second bus terminal M2 of the motor inverter 20 is connected with a second end of the battery 70. The first switch module 10 is configured to control the connection and disconnection of the first bus terminal M1 of the motor inverter 20 and the first end of the battery 70, or the first switch module 10 is configured to control connection and disconnection of the second bus terminal M2 of the motor inverter 20 and the second end of the battery 70, or the first switch module 10 is configured to control connection and disconnection of the first bus terminal M1 of the motor inverter 20 and the first end of the battery 70 and connection and disconnection of the second bus terminal M2 of the motor inverter 20 and the second end of the battery 70.

A first end of the motor winding 30 is connected with a midpoint end M3 of motor inverter 20. The second switch module 40 and the first capacitor 50 are serial-connected. A first end of the serial-connected second switch module 40 and the first capacitor 50 is connected with a second end of the motor winding 30. A second ends of the serial-connected second switch module 40 and the first capacitor 50 is connected with the second bus terminal M2 of the motor inverter 20.

The controller 60 is configured to: control the first switch module 10 to be turned off based on a command representing release of an accumulator, to disconnect the battery 70 from the motor inverter 20, and control the motor inverter 20 to release energy stored in the first capacitor 50 when the second switch module 40 is turned on.

According to the above energy conversion apparatus, the controller 60 controls the first switch module 10 to be turned on, the second switch module 40 to be turned off, and turning on and off of the motor inverter 20, so that the battery 70, the first switch module 10, the motor inverter 20, and the motor winding 30 form a motor driving circuit. The controller 60 controls the first switch module 10 to be turned on, the second switch module 40 to be turned off, and turning on and off of the motor inverter 20, so that the battery 70, the first switch module 10, the motor inverter 20, the motor winding 30, the second switch module 40, and the first capacitor 50 form a battery heating circuit. The battery heating circuit includes four stages, specifically including a battery discharging circuit, a motor winding freewheel circuit, a motor winding energy storage circuit and battery charging circuit. The battery 70 discharges to the first capacitor 50 through an upper bridge arm of the motor inverter 20, the motor winding 30, and the second switch module 40 to form the battery discharging circuit. The motor winding 30 performs freewheeling through the second switch module 40, the first capacitor 50, and a lower bridge arm of the motor inverter 20 to form the motor winding freewheel circuit. The motor winding 30 stores energy from the first capacitor 50 through the second switch module 40 and the lower bridge arm of the motor inverter 20 to form the motor winding energy storage circuit. The first capacitor 50 discharges to the battery through the second switch module 40, the motor winding 30, and the upper bridge arm of the motor inverter 20 to form the battery charging circuit.

In the present disclosure, the second switch module 40 being turned on can include at least one of the following:
  (1) Sintering the second switch module 40. When the second switch module 40 is sintered, the second switch module 40 is in a short-circuited state. In this case, it is considered that the second switch module 40 is conductive.
  (2) After an external apparatus charges the battery 70 through the energy conversion apparatus in the embodiments of the present disclosure, the second switch module 40 is not sintered, and the second switch module 40 is controlled to be turned on based on the command representing the release of the accumulator (after the external apparatus charges the battery 70 through the energy conversion apparatus in the embodiments of the present disclosure, some energy still remains in the first capacitor 50, and for safety, the energy stored in the first capacitor 50 needs to be released). In this case, since the second switch module 40 is not sintered, switching of the second switch module may still be controlled by the controller 60. However, when the energy stored in the first capacitor 50 needs to be released, the second switch module 40 needs to be in a conductive state so that the energy release circuit can be connected. Therefore, in this case, it is necessary to control the second switch module 40 to be turned on based on the command representing the release of the accumulator.
  (3) After self-heating of the battery 70 through the energy conversion apparatus is performed in the embodiments of the present disclosure, the second switch module 40 is not sintered, and the second switch module 40 is controlled to be turned on based on the command representing the release of the accumulator (after the self-heating of the battery 70 is performed through the energy conversion apparatus in the embodiments of the present disclosure, some energy still remains in the first capacitor 50, and for safety, the energy stored in the first capacitor 50 needs to be released). In this case, since the second switch module 40 is not sintered, switching of the second switch module may still be controlled by the controller 60. However, when the energy stored in the first capacitor 50 needs to be released, the second switch module 40 needs to be in a conductive state so that the energy release circuit can be connected. Therefore, in this case, it is necessary to turn on the second switch module 40 based on the command representing the release of the accumulator.

(4) After the driving function is realized through the energy conversion apparatus in the embodiments of the present disclosure, the second switch module 40 is not sintered, and the second switch module 40 is controlled to be turned on based on the command representing the release of the accumulator (after the driving function is realized through the energy conversion apparatus in the embodiments of the present disclosure, some energy still remains in the second capacitor, and for safety, the energy stored in the second capacitor needs to be released). In this case, since the second switch module 40 is not sintered, switching of the second switch module may still be controlled by the controller 60. However, when the energy stored in the first capacitor 50 needs to be released, the second switch module 40 needs to be in a conductive state so that the energy release circuit can be connected. Therefore, in this case, it is necessary to turn on the second switch module 40 based on the command representing the release of the accumulator.

The above technical solutions have the following beneficial effects.

(1) The energy conversion apparatus in the present disclosure can realize the motor driving function by controlling the second switch module 40 to be turned off, and can realize the battery heating function by controlling the second switch module 40 to be turned on.

(2) Since the energy release of the first capacitor 50 can be realized through the linkage between the components of the energy conversion apparatus, additional components are not required, which can reduce the costs of the whole vehicle.

(3) Since the motor inverter 20 is controlled to release the energy stored in the first capacitor 50 when the first switch module 10 disconnects the battery 70 from the motor inverter 20 and the second switch module 40 is in a conductive state, the following benefits are realized. On the one hand, a high voltage safety problem caused by the battery 70 during the energy release of the first capacitor 50 is resolved. On the other hand, it can be learned from the topology of FIG. 1 that during the energy release, the first switch module 10 is in an off state and the second switch module 40 is in a conductive state. Therefore, the energy stored in the first capacitor 50 is released by a circulating loop composed of the motor inverter 20, the motor winding 30, the second switch module 40, and the first capacitor 50. That is to say, energy losses caused by the repeated switching of the motor inverter 20, energy consumption generated by the motor inverter 20 in the conductive state, and heat losses on the motor winding 30 realize consumption of the high voltage energy on the first capacitor 50, thereby realizing the energy release of the first capacitor 50. In addition, since a release current during the release is not very large, false sintering of the second switch module 40 caused by software bugs or incomplete sintering caused by the second switch module 40 is prevented from turning into true sintering of the second switch module 40, thereby preventing secondary damage to the second switch module 40.

Figure 2:
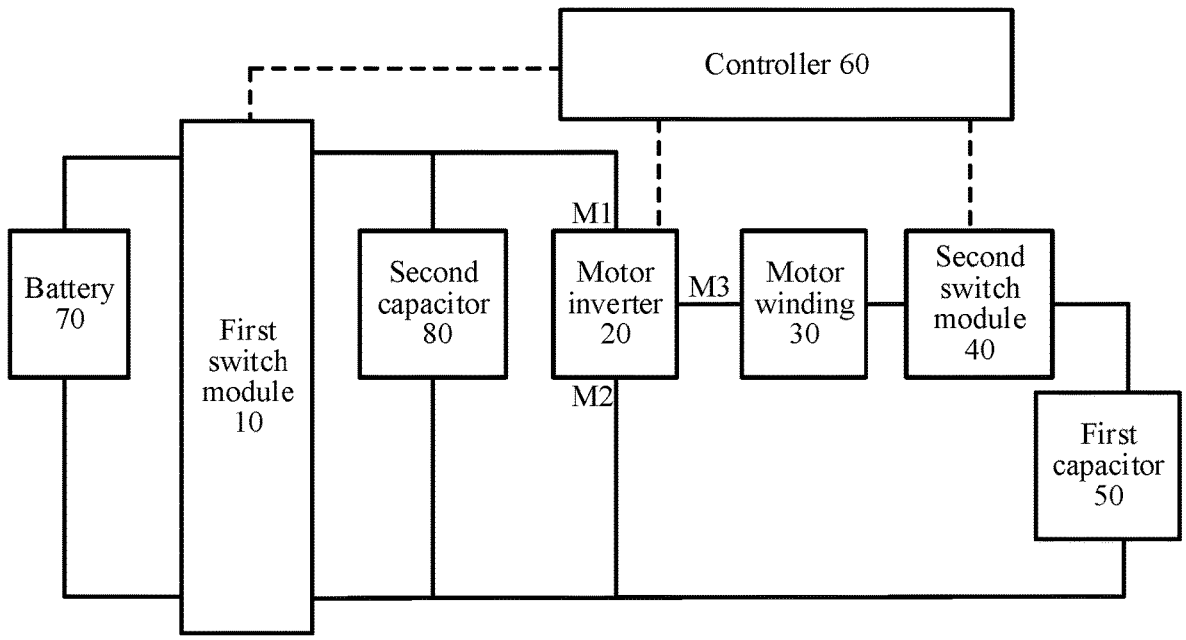
FIG. 2 shows another schematic topology structure of the energy conversion apparatus according to an embodiment of the present disclosure.

FIG. 2 shows another schematic topology structure of the energy conversion apparatus according to an embodiment of the present disclosure. As shown in FIG. 2, the energy conversion apparatus further includes a second capacitor 80. A first end of the second capacitor 80 is connected with the first bus terminal M1 of the motor inverter 20. A second end of the second capacitor 80 is connected with the second bus terminal M2 of the motor inverter 20.

The controller 60 is further configured to: control the first switch module 10 to be turned off based on the command representing release of the accumulator, to disconnect the battery 70 from the second capacitor 80 and the motor inverter 20, and control the motor inverter 20 to release the energy stored in the first capacitor 50 and energy stored in the second capacitor 80 when the second switch module 40 is turned on. The reason for releasing the energy stored in the second capacitor 80 is that high-voltage energy remains in the second capacitor 80 after charging of the battery 70, the self-heating of the battery 70, and the driving function are realized through the energy conversion apparatus in the embodiments of the present disclosure. For safety, it is necessary to release the energy stored in the second capacitor 80.

Since the energy release of the second capacitor 80 is also realized through the linkage between the components of the energy conversion apparatus, additional components are not required, which can reduce the costs of the whole vehicle. In addition, the principle of the energy release of the second capacitor 80 is similar to the principle of the energy release of the first capacitor 50 described above, that is, the energy release is realized through the energy losses caused by the repeated switching of the motor inverter 20, the energy consumption generated by the motor inverter 20 in the conductive state, and the heat losses on the motor winding 30. Therefore, a release current during the release is not large, so that false sintering of the second switch module 40 caused by software bugs or incomplete sintering caused by the second switch module 40 is prevented from turning into true sintering of the second switch module 40, thereby preventing secondary damage to the second switch module 40.

FIG. 3 is a schematic circuit diagram of the energy conversion apparatus according to an embodiment of the present disclosure. As shown in FIG. 3, the motor inverter 20 includes N-phase bridge arms, and the motor winding 30 includes N windings. First ends of the N windings are respectively connected with midpoint ends of the N-phase bridge arms (that is, positions shown by A, B, and C in FIG. 3) in a one-to-one correspondence. N≥1.

Still referring to FIG. 3, the first switch module 10 includes a positive contactor K1 connected between the first end of the battery 70 and the first bus terminal of the motor inverter 20, and further includes a negative contactor K2 connected between the second end of the battery 70 and the second bus terminal of the motor inverter 20. The positive contactor K1 may be configured to disconnect the first end of the battery 70 from the first bus terminal of the motor inverter 20, thereby disconnecting the battery 70 from the motor inverter. The negative contactor K2 may be configured to disconnect the second end of the battery 70 from the second bus terminal of the motor inverter 20, thereby disconnecting the battery 70 from the motor inverter. Those skilled in the art may understand that the first switch module 10 may include only the positive contactor K1, or only the negative contactor K2, or both the positive contactor K1 and the negative contactor K2.

In addition, those skilled in the art should further understand that the specific structure of the motor inverter 20, the specific structure of the motor winding 30, and the specific structure of the first switch module 10 shown in FIG. 3 are merely examples, which are not limited in the present disclosure.

FIG. 4 is a flowchart of a safety control method for an energy conversion apparatus according to an embodiment of the present disclosure. The method may be used to release the energy stored in the energy conversion apparatus shown in FIGS. 1-3. As shown in FIG. 4, the method includes the following steps S41 to S42.

Step S41: The first switch module 10 is controlled to be turned off based on a command representing release of an accumulator, to disconnect the battery 70 from the motor inverter 20.

Step S42: When the second switch module 40 is turned on, the motor inverter 20 is controlled to release energy stored in the first capacitor 50.

In the present disclosure, the second switch module 40 being turned on can include at least one of the following:

(1) Sintering of the second switch module 40. When the second switch module 40 is sintered, the second switch module 40 is in a short-circuited state. In this case, it is considered that the second switch module 40 is turned on.

(2) After an external apparatus charges the battery 70 through the energy conversion apparatus in the embodiments of the present disclosure, the second switch module 40 is not sintered, and the second switch module 40 is controlled to be turned on based on the command representing the release of the accumulator (after the external apparatus charges the battery 70 through the energy conversion apparatus in the embodiments of the present disclosure, some energy still remains in the first capacitor 50, and for safety, the energy stored in the first capacitor 50 needs to be released). In this case, since the second switch module 40 is not sintered, switching of the second switch module may still be controlled. However, when the energy stored in the first capacitor 50 needs to be released, the second switch module 40 needs to be in a conductive state so that the energy release circuit can be connected. Therefore, in this case, it is necessary to control the second switch module 40 to be turned on based on the command representing the release of the accumulator.

(3) After self-heating of the battery 70 is performed through the energy conversion apparatus in the embodiments of the present disclosure, the second switch module 40 is not sintered, and the second switch module 40 is controlled to be turned on based on the command representing the release of the accumulator (after the self-heating of the battery 70 is performed through the energy conversion apparatus in the embodiments of the present disclosure, some energy still remains in the first capacitor 50, and for safety, the energy stored in the first capacitor 50 needs to be released). In this case, since the second switch module 40 is not sintered, switching of the second switch module may still be controlled. However, when the energy stored in the first capacitor 50 needs to be released, the second switch module 40 needs to be in a conductive state so that the energy release circuit can be connected. Therefore, in this case, it is necessary to control the second switch module 40 to be turned on based on the command representing the release of the accumulator.

(4) After the driving function is realized through the energy conversion apparatus in the embodiments of the present disclosure, the second switch module 40 is not sintered, and the second switch module 40 is controlled to be turned on based on the command representing the release of the accumulator (after the driving function is realized through the energy conversion apparatus in the embodiments of the present disclosure, some energy still remains in the second capacitor, and for safety, the energy stored in the second capacitor needs to be released). In this case, since the second switch module 40 is not sintered, switching of the second switch module may still be controlled. However, when the energy stored in the first capacitor 50 needs to be released, the second switch module 40 needs to be in a conductive state so that the energy release circuit can be connected. Therefore, in this case, it is necessary to control the second switch module 40 to be turned on based on the command representing the release of the accumulator.

The above technical solutions have the following beneficial effects:

(1) Since the energy release of the first capacitor 50 can be realized through the linkage between the components of the energy conversion apparatus, additional components are not required, which can reduce the costs of the whole vehicle.

(2) Since the motor inverter 20 is controlled to release the energy stored in the first capacitor 50 when the first switch module 10 disconnects the battery 70 from the motor inverter 20 and the second switch module 40 is in a conductive state, the following benefits are realized. On the one hand, a high voltage safety problem caused by the battery 70 during the energy release of the first capacitor 50 is resolved. On the other hand, it can be learned from the topology of FIG. 1 that during the energy release, the first switch module 10 is in an off state and the second switch module 40 is in a conductive state. Therefore, the energy stored in the first capacitor 50 is released by a circulating loop composed of the motor inverter 20, the motor winding 30, the second switch module 40, and the first capacitor 50. That is to say, energy losses caused by the repeated switching of the motor inverter 20, energy consumption generated by the motor inverter 20 in the conductive state, and heat losses on the motor winding 30 realize consumption of the high voltage energy on the first capacitor 50, thereby realizing the energy release of the first capacitor 50. In addition, since a release current during the release is not very large, false sintering of the second switch module 40 caused by software bugs or incomplete sintering caused by the second switch module 40 is prevented from turning into true sintering of the second switch module 40, thereby preventing secondary damage to the second switch module 40.

FIG. 5 is another flowchart of the safety control method for an energy conversion apparatus according to an embodiment of the present disclosure. The process may be used to release the energy stored in the energy conversion apparatus shown in FIG. 2. As shown in FIG. 5, the method includes the following steps S51 to S52.

Step S51: The first switch module 10 is controlled to be turned off based on a command representing release of an accumulator, to disconnect the battery 70 from the second capacitor 80 and the motor inverter 20.

Step S52: When the second switch module 40 is turned on, the motor inverter 20 is controlled to release the energy stored in the first capacitor 50 and energy stored in the second capacitor 80.

The case where the second switch module 40 is turned on has been described above, and therefore is not repeated herein.

In addition, step S52 may include the following steps.

Step S52a: The motor inverter 20 is controlled to release the energy stored in the first capacitor 50.

Step S52b: The motor inverter 20 is controlled to release the energy stored in the second capacitor 80 through the first capacitor 50.

For example, firstly, the upper bridge arm of the motor inverter 20 is controlled to be turned on, so that the second capacitor 80 charges the first capacitor 50. Then, the upper bridge arm of the motor inverter 20 is controlled to remain turned off, and the lower bridge arm of the motor inverter 20 is controlled to be turned on and off alternately, so as to release the energy stored in the charged first capacitor 50. The step of controlling the upper bridge arm of the motor inverter 20 to be turned on and the step of controlling the upper bridge arm to remain turned off and controlling the lower bridge arm of the motor inverter 20 to be turned on and off alternately are repeated, until a voltage of the second capacitor 80 is lower than a preset voltage (for example, 60 V or other preset values). In this way, the energy release of the second capacitor 80 is realized.

When the motor inverter 20 includes multiple bridge arms, the alternating on and off of the lower bridge arm in the present disclosure means alternating on and off of at least one lower bridge arm. A number of lower bridge arms to be turned on and off alternately is controlled to control a magnitude of the release current, thereby avoiding secondary damage to the second switch module 40 during the release.

A time the second capacitor 80 charges the first capacitor 50 may be calibrated according to a vehicle type, a capacitance value of the first capacitor 50, and a capacitance value of the second capacitor 80. For example, the time may be 250 ms, 100 ms, or other values.

In step S52, the energy stored in the first capacitor 50 is first released, and then the energy stored in the second capacitor 80 is released through the first capacitor 50, which can prevent the first capacitor 50 from forming an impulse current with the second capacitor 80 through an uncontrollable diode of the motor inverter 20, thereby avoiding damage to the second switch module 40 during the release.

According to the above technical solution, since the energy release of the second capacitor 80 is also realized through the linkage between the components of the energy conversion apparatus, additional components are not required, which can reduce the costs of the whole vehicle. In addition, the principle of the energy release of the second capacitor 80 is similar to the principle of the energy release of the first capacitor 50 described above, that is, the energy release is realized through the energy losses caused by the repeated switching of the motor inverter 20, the energy consumption generated by the motor inverter 20 in the conductive state, and the heat losses on the motor winding 30. Therefore, a release current during the release is not large, so that false sintering of the second switch module 40 caused by software bugs or incomplete sintering caused by the second switch module 40 is prevented from turning into true sintering of the second switch module 40, thereby preventing secondary damage to the second switch module 40.

In an embodiment, the control of the motor inverter 20 to release the energy stored in the first capacitor 50 in steps S42 and S52a may include: controlling the upper bridge arm of the motor inverter 20 to remain turned off, and controlling the lower bridge arm of the motor inverter 20 to be turned on and off alternately, so as to release the energy stored in the first capacitor 50.

According to the technical solution, consumption of the high-voltage energy on the first capacitor 50 can be realized through the energy losses caused by the repeated switching of the lower bridge arm of the motor inverter 20, the energy consumption generated by the lower bridge arm of the motor inverter 20 in the conductive state, and the heat losses on the motor winding 30, thereby realizing the energy release of the first capacitor 50. In addition, since a release current during the release is not very large, false sintering of the second switch module 40 caused by software bugs or incomplete sintering caused by the second switch module 40 is prevented from turning into true sintering of the second switch module 40, thereby preventing secondary damage to the second switch module 40.

Figure 6:
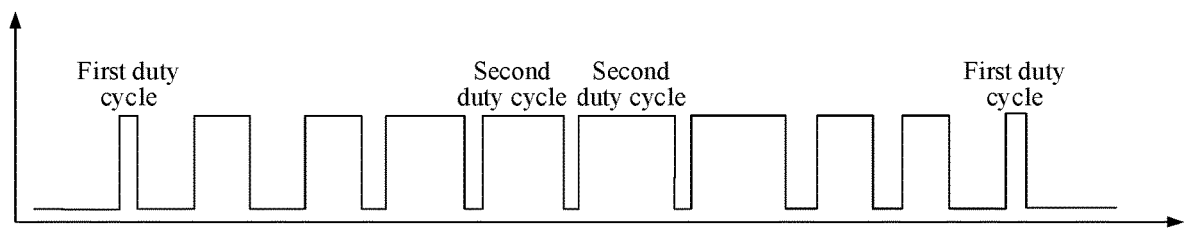
FIG. 6 is a schematic diagram of alternately adjusting closing and opening of a lower bridge arm of the motor inverter.

FIG. 6 is a schematic diagram of alternately adjusting the switching of the lower bridge arm of the motor inverter 20. It can be learned from the figure that alternately adjusting the switching of the lower bridge arm includes: firstly controlling a duty cycle of the lower bridge arm (that is, in one cycle, a time the lower bridge arm is turned on/(a time the lower bridge arm is turned on+a time the lower bridge arm is turned off)) to gradually increase from a first duty cycle to a second duty cycle, and then controlling the duty cycle of the lower bridge arm to gradually decrease from the second duty cycle to the first duty cycle. Specific values of the first duty cycle and the second duty cycle are not limited in the present disclosure, as long as different duty cycles can be continuously cycled. For example, the first duty cycle may be 20% or other values, and the second duty cycle may be 80%. Furthermore, a rate of the increase from the first duty cycle to the second duty cycle and a rate of the decrease from the second duty cycle to the first duty cycle are not limited in the present disclosure.

The continuous cycle of the first duty cycle and the second duty cycle realizes consumption of the remaining energy in the first capacitor 50 and the second capacitor 80. Moreover, the release method realizes release of the energy in the first capacitor 50 and the second capacitor 80 within the time required by the national standard.

The present disclosure further provides methods for determining whether the second switch module 40 is sintered.

A first method for determining whether the second switch module 40 is sintered includes the following steps. Firstly, the motor inverter 20 is controlled to perform a self-test. When the self-test of the motor inverter 20 indicates normal, the second switch module 40 is controlled to be turned off, and the first switch module 10 is controlled to connect the battery 70 to the motor inverter 20. Then, all lower bridge arms of the motor inverter 20 are controlled to be turned off, and at least one upper bridge arm of the motor inverter 20 is controlled to be turned on. Next, it is determined whether a current flows through the motor inverter 20. If current flows through the motor inverter 20, it is determined that the second switch module 40 is sintered. If no current flows through the second switch module, it is determined that the second switch module 40 is not sintered. An existing current sensor in the motor inverter 20 for detecting a phase current of the motor inverter can be used to detect whether a current flows through the motor inverter 20, so that additional components are not required, thereby reducing the costs.

A second method for determining whether the second switch module 40 is sintered includes the following steps. Firstly, the motor inverter 20 is controlled to perform a self-test. When the self-test of the motor inverter 20 indicates normal, the second switch module 40 is controlled to be turned on, and the first switch module 10 is controlled to connect the battery 70 to the motor inverter 20. Then lower bridge arms of the motor inverter 20 are controlled to be turned off, and at least one upper bridge arm of the motor inverter 20 is controlled to be turned on, so that the battery 70 charges the second capacitor 80. Next, the second switch module 40 is controlled to be turned off, the upper bridge arm of the motor inverter 20 is controlled to be turned off, and at least one lower bridge arm of the motor inverter 20 is controlled to be turned on. Next, it is determined whether a current flows through the motor inverter 20. If current flows through the motor inverter 20, it is determined that the second switch module 40 is sintered. If no current flows through the second switch module, it is determined that the second switch module 40 is not sintered. An existing current sensor in the motor inverter 20 for detecting a phase current of the motor inverter can be used to detect whether a current flows through the motor inverter 20, so that additional components are not required, thereby reducing the costs.

An advantage of the above first determination method is that the control method is simple. An advantage of the second determination method above is that the current is controllable, which can avoid secondary damage to the second switch module 40 during the sintering detection.

The preferred implementations of the present disclosure are described in detail above with reference to the accompanying drawings. However, the present disclosure is not limited to the specific details in the foregoing implementations, multiple simple deformations may be made to the technical solution of the present disclosure within a range of the technical concept of the present disclosure, and these simple deformations fall within the protection scope of the present disclosure.

It should be additionally noted that, the specific technical features described in the foregoing specific implementations may be combined in any proper manner in a case without conflict. To avoid unnecessary repetition, various possible combinations will not be described in the present disclosure.

In addition, various different implementations of the present disclosure may alternatively be combined randomly. Such combinations should also be considered as the content disclosed in the present disclosure provided that these combinations do not depart from the concept of the present disclosure.

What is claimed is:

1. An energy conversion apparatus, comprising:
    a battery;
    a motor inverter, having a first terminal and a second terminal respectively connected to a first end and a second end of the battery, and comprising an upper bridge arm and a lower bridge arm;
    a first switch module including at least one first switch connected between the first terminal of the motor inverter and the first end of the battery or the second terminal of the motor inverter and the second end of the battery;
    a motor winding having a first end connected to the motor inverter;
    a second switch module having a first end connected to a second end of the motor winding;
    a first capacitor having a first end connected to the second switch module and a second end connected to the second terminal of the motor inverter;
    a second capacitor having a first end connected to the first terminal of the motor inverter and a second end connected to the second terminal of the motor inverter; and
    a controller coupled to the first switch module and motor inverter and configured to control the first switch module to be off to disconnect the battery from the second capacitor and the motor inverter, and control the motor inverter to release energy stored in the first capacitor and the second capacitor when the second switch module is on by:
        1) Controlling the upper bridge arm of the motor inverter to be on, so that the second capacitor charges the first capacitor;
        2) Controlling the upper bridge arm to be off, and controlling the lower bridge arm of the motor inverter to be on and off alternately, so as to release energy stored in the charged first capacitor; and
        repeating steps of 1) and 2) until a voltage of the second capacitor is lower than a preset voltage.

2. The energy conversion apparatus according to claim 1, wherein the first end of the motor winding is connected to a mid-point between the upper bridge arm and the lower bridge arm of the motor inverter.

3. The energy conversion apparatus according to claim 1, wherein the controller is further configured to control a time when the second capacitor charges the first capacitor according to a vehicle type, a capacitance value of the first capacitor, and a capacitance value of the second capacitor.

4. The energy conversion apparatus according to claim 1, wherein, to control the lower bridge arm of the motor inverter to be on and off alternately, the controller is further configured to:
    control a duty cycle of the lower bridge arm to gradually increase from a first duty cycle to a second duty cycle, and control the duty cycle of the lower bridge arm to gradually decrease from the second duty cycle to the first duty cycle.

5. The energy conversion apparatus according to claim 1, wherein the second switch module being turned on comprises at least one of the following:
    the second switch module is sintered;
    after charging of the battery is completed through the energy conversion apparatus, the second switch module is controlled to be turned on;
    after self-heating of the battery is completed through the energy conversion apparatus, the second switch module is controlled to be turned on; or
    after a driving function is completed through the energy conversion apparatus, the second switch module is controlled to be turned on.

6. An energy conversion apparatus, comprising:
    a first switch module;
    a motor inverter, having a first bus terminal connected with a first end of a battery and a second bus terminal connected with a second end of the battery and comprising an upper bridge arm and a lower bridge arm, wherein the first switch module is configured to control connection and disconnection between the first bus terminal of the motor inverter and the first end of the battery; or the first switch module is configured to control connection and disconnection between the second bus terminal of the motor inverter and the second end of the battery; or the first switch module is configured to control connection and disconnection between the first bus terminal of the motor inverter and the first end of the battery and connection and disconnection between the second bus terminal of the motor inverter and the second end of the battery;

a motor winding, having a first end connected with a midpoint end of the motor inverter;

a second switch module and a first capacitor, wherein the second switch module and the first capacitor are serial-connected; a first end of the serial-connected second switch module and the first capacitor is connected with a second end of the motor winding; and a second end of the serial-connected second switch module and the first capacitor is connected with the second bus terminal of the motor inverter;

a second capacitor having a first end connected to a first terminal of the motor inverter and a second end connected to a second terminal of the motor inverter; and a controller coupled to the first switch module and motor inverter and configured to: control the first switch module to be turned off based on a command representing release of an accumulator, to disconnect the battery from the second capacitor and the motor inverter, and control the motor inverter to release energy stored in the first capacitor and the second capacitor when the second switch module is turned on by:
1) Controlling the upper bridge arm of the motor inverter to be on, so that the second capacitor charges the first capacitor;
2) Controlling the upper bridge arm to be off, and controlling the lower bridge arm of the motor inverter to be on and off alternately, so as to release energy stored in the charged first capacitor; and
repeating steps of 1) and 2) until a voltage of the second capacitor is lower than a preset voltage.

7. A safety control method for an energy conversion apparatus, wherein the energy conversion apparatus comprises:
a first switch module;
a motor inverter, having a first bus terminal connected with a first end of a battery and a second bus terminal connected with a second end of the battery and comprising an upper bridge arm and a lower bridge arm, wherein the first switch module is configured to control connection and disconnection between the first bus terminal of the motor inverter and the first end of the battery; or the first switch module is configured to control connection and disconnection between the second bus terminal of the motor inverter and the second end of the battery; or the first switch module is configured to control connection and disconnection between the first bus terminal of the motor inverter and the first end of the battery and connection and disconnection between the second bus terminal of the motor inverter and the second end of the battery;
a motor winding, having a first end connected with a midpoint end of the motor inverter;
a second switch module and a first capacitor, wherein the second switch module and the first capacitor are serial-connected; a first end of the serial-connected second switch module and the first capacitor is connected with a second end of the motor winding; and a second end of the serial-connected second switch module and the first capacitor is connected with the second bus terminal of the motor inverter; and a second capacitor having a first end connected to a first terminal of the motor inverter and a second end connected to a second terminal of the motor inverter;

wherein the method comprises:
controlling the first switch module to be turned off to disconnect the battery from the second capacitor and the motor inverter, and
controlling the motor inverter to release energy stored in the first capacitor and the second capacitor when the second switch module is turned on by:
1) Controlling the upper bridge arm of the motor inverter to be on, so that the second capacitor charges the first capacitor;
2) Controlling the upper bridge arm to be off, and controlling the lower bridge arm of the motor inverter to be on and off alternately, so as to release energy stored in the charged first capacitor; and
repeating steps of 1) and 2) until a voltage of the second capacitor is lower than a preset voltage.

8. The safety control method for an energy conversion apparatus according to claim 7, wherein the controlling the motor inverter to release the energy stored in the first capacitor and energy stored in the second capacitor comprises:
controlling the motor inverter to release the energy stored in the first capacitor, and controlling the motor inverter to release the energy stored in the second capacitor through the first capacitor.

9. The safety control method for an energy conversion apparatus according to claim 7, wherein a time when the second capacitor charges the first capacitor is calibrated according to a vehicle type, a capacitance value of the first capacitor, and a capacitance value of the second capacitor.

10. The safety control method for an energy conversion apparatus according to claim 7, wherein the alternately turning on and off the lower bridge arm is adjusted by:
controlling a duty cycle of the lower bridge arm to gradually increase from a first duty cycle to a second duty cycle, and controlling the duty cycle of the lower bridge arm to gradually decrease from the second duty cycle to the first duty cycle.

11. The safety control method for an energy conversion apparatus according to claim 7, wherein the second switch module being turned on comprises at least one of the following:
the second switch module is sintered;
after charging of the battery is completed through the energy conversion apparatus, the second switch module is not sintered, and the second switch module is controlled to be turned on;
after self-heating of the battery is completed through the energy conversion apparatus, the second switch module is not sintered, and the second switch module is controlled to be turned on; or
after a driving function is completed through the energy conversion apparatus, the second switch module is not sintered, and the second switch module is controlled to be turned on.

12. The safety control method for an energy conversion apparatus according to claim 11, wherein the sintering of the second switch module is determined by:
controlling the second switch module to be turned off, and controlling the first switch module to connect the battery with the motor inverter;
controlling the lower bridge arm of the motor inverter to be turned off, and controlling at least one upper bridge arm of the motor inverter to be turned on; and determining that the second switch module is sintered if current flows through the motor inverter.

13. The safety control method for an energy conversion apparatus according to claim 11, wherein the sintering of the second switch module is determined by:
   controlling the second switch module to be turned on, and controlling the first switch module to connect the battery with the motor inverter;
   controlling the lower bridge arm of the motor inverter to be turned off, and controlling at least one upper bridge arm of the motor inverter to be turned on, so that the battery charges the second capacitor;
   controlling the second switch module to be turned off, controlling the upper bridge arm of the motor inverter to be turned off, and controlling at least one lower bridge arm of the motor inverter to be turned on; and
   determining that the second switch module is sintered if current flows through the motor inverter.

\* \* \* \* \*